(12) United States Patent
Mitchell et al.

(10) Patent No.: US 9,390,084 B2
(45) Date of Patent: *Jul. 12, 2016

(54) NATURAL LANGUAGE PARSERS TO NORMALIZE ADDRESSES FOR GEOCODING

(71) Applicant: Telogis, Inc., Aliso Viejo, CA (US)

(72) Inventors: David John Mitchell, Christchurch (NZ); Arthur Newth Morris, Laguna Beach, CA (US); Ralph James Mason, Christchurch (NZ)

(73) Assignee: TELOGIS, INC., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,459

(22) Filed: Oct. 3, 2014

(65) Prior Publication Data

US 2015/0127324 A1 May 7, 2015

Related U.S. Application Data

(63) Continuation of application No. 12/240,853, filed on Sep. 29, 2008, now Pat. No. 8,868,479.

(60) Provisional application No. 60/976,341, filed on Sep. 28, 2007.

(51) Int. Cl.
*G06F 15/00* (2006.01)
*G06F 15/18* (2006.01)
*G06F 17/27* (2006.01)

(52) U.S. Cl.
CPC .......... *G06F 17/277* (2013.01); *G06F 17/2705* (2013.01); *G06F 17/278* (2013.01)

(58) Field of Classification Search
CPC . G06F 17/2705; G06F 17/277; G06F 17/278; G06F 17/30539; G06F 9/6219

USPC .......................................................... 706/62
See application file for complete search history.

(56) References Cited

U.S. PATENT DOCUMENTS

| 4,914,590 A | 4/1990 | Loatman |
| 5,197,005 A | 3/1993 | Shwartz |

(Continued)

FOREIGN PATENT DOCUMENTS

WO    WO 02103559    12/2002

OTHER PUBLICATIONS

Majewski, Official Google Maps API Blog: Geocoding at last!, http://googlemapsapi.blogspt.com/2006/06/geocoding-at-last.html (Jun. 13, 2006).

(Continued)

*Primary Examiner* — Kakali Chaki
*Assistant Examiner* — Peter Coughlan
(74) *Attorney, Agent, or Firm* — Knobbe, Martens, Olson & Bear LLP

(57) ABSTRACT

The present invention provides a technique for building natural language parsers by implementing a country and/or jurisdiction specific set of training data that is automatically converted during a build phase to a respective predictive model, i.e., an automated country specific natural language parser. The predictive model can be used without the training data to quantify any input address. This model may be included as part of a larger Geographic Information System (GIS) dataset or as a stand alone quantifier. The build phase may also be run on demand and the resultant predictive model kept in temporary storage for immediate use.

13 Claims, 4 Drawing Sheets

(56) References Cited

U.S. PATENT DOCUMENTS

| | | | |
|---|---|---|---|
| 5,761,631 A | 6/1998 | Nasukawa | |
| 5,835,907 A | 11/1998 | Newman | |
| 6,182,029 B1 | 1/2001 | Friedman | |
| 6,219,643 B1 | 4/2001 | Cohen | |
| 6,343,290 B1 | 1/2002 | Cossins | |
| 6,513,006 B2 | 1/2003 | Howard | |
| 6,513,063 B1 | 1/2003 | Julia | |
| 6,829,603 B1 | 12/2004 | Chai | |
| 6,937,975 B1 | 8/2005 | Elworthy | |
| 7,039,640 B2 | 5/2006 | Miller | |
| 7,231,405 B2 | 6/2007 | Xia | |
| 7,308,117 B2 | 12/2007 | Chitradon | |
| 7,415,448 B2 | 8/2008 | Thota | |
| 7,818,333 B2 | 10/2010 | Biard et al. | |
| 7,983,913 B2 | 7/2011 | Seltzer et al. | |
| 2001/0041980 A1 | 11/2001 | Howard | |
| 2002/0126990 A1* | 9/2002 | Rasmussen | H04N 7/17318 386/240 |
| 2002/0143462 A1 | 10/2002 | Warren | |
| 2002/0156629 A1 | 10/2002 | Carberry et al. | |
| 2002/0196679 A1 | 12/2002 | Lavi | |
| 2003/0158667 A1 | 8/2003 | Chen | |
| 2003/0212543 A1 | 11/2003 | Epstein | |
| 2003/0233224 A1 | 12/2003 | Marchisio | |
| 2004/0107088 A1 | 6/2004 | Budzinski | |
| 2004/0122661 A1 | 6/2004 | Hawkinson | |
| 2005/0182770 A1 | 8/2005 | Rasmussen | |
| 2005/0289124 A1 | 12/2005 | Kaiser | |
| 2006/0041573 A1† | 2/2006 | Miller | |
| 2006/0095250 A1 | 5/2006 | Chen | |
| 2006/0112029 A1 | 5/2006 | Estes | |
| 2006/0116987 A1 | 6/2006 | Bernard | |
| 2006/0117307 A1 | 6/2006 | Averbuch et al. | |
| 2007/0015119 A1 | 1/2007 | Atenasio | |
| 2007/0106499 A1 | 5/2007 | Dahlgren | |
| 2007/0156435 A1 | 7/2007 | Greening et al. | |
| 2007/0192085 A1 | 8/2007 | Roulland | |
| 2007/0244693 A1 | 10/2007 | Atallah | |
| 2008/0004802 A1 | 1/2008 | Horvitz | |
| 2008/0010259 A1 | 1/2008 | Feng | |
| 2008/0065628 A1 | 3/2008 | Bansal | |
| 2008/0065658 A1 | 3/2008 | Sharma et al. | |
| 2008/0071519 A1 | 3/2008 | Brun | |
| 2008/0086298 A1 | 4/2008 | Anismovich | |
| 2008/0091408 A1 | 4/2008 | Roulland | |
| 2008/0301092 A1† | 12/2008 | Jayanti | |

OTHER PUBLICATIONS

Christen Peter, Chruches Tim, Willmore Alan, A Probablistic Geocoding System based on a National Address File [online], 2004 [retrieving on Mar. 15, 2013. Retrieved from the Internet URL <http://cs.anu.edu.au/-Peter.Christen/publications/ai2004-v2.pdf>.

'Computational Intellingence', Konar, 2005, Springer.

Wong et al., "A hybrid approach to address normalization", IEEE, 1994, pp. 38-45.

Blessing et al., Inst for Natural Language Process, Stuttgart Univ., Germany; Pervasive Computing and Communications Workshops, 2006, PerCom Workshops 2006, Fourth Annual IEEE International Conference, Mar. 13-17, 2006, 6 pages.

Leng et al., "A Voice Input Word Processor System", Sch. of Electr. & Electron. Eng., Nayang Technol. Inst., Singapore; TENCON '93, Proceedings. Computer, Communication, Control and Power Engineering, 1993 IEEE Region 10 Conference, Oct. 19-21, 1993, Part 20000, pp. 1082-1085, vol. 2.

White, "Emerging Requirements for Digital Maps for In-Vehicle Pathfinding and Other Traveling Assistance", Vehicle Navigation and Information Systems Conference, 1991,Oct. 20-23, 1991, vol. 2. pp. 179-184.

Zue, "Toward Systems that Understand Spoken Language", Lab. For Comput. Sci., MIT, Cambridge, MA, USA, IEEE Expert, Feb. 1994, vol. 9, Issue 1, pp. 51-59.

\* cited by examiner
† cited by third party

```
//^(?<keeper>[0-9]+) *(?<keeper>(/|-))(/|-)* *(?<keeper>[0-9]+)$,NUM
//^(?<keeper>[0-9]+)[\/\\\-]+\w*$,XNUM
//^[0-9]{4}$,POSTCODE
//^(nsw|vic|act|tas|sa|qld|ql|nt|wa)$,STATE
```
⎫
⎬ 201-204
⎭

BASENAME:Elizabeth,TYP_AFT:St,CITY:Waterloo,POSTCODE:2017 } 205

NUM:54,BASENAME:Terrace,TYP_AFT:Road,POSTCODE:6000,CITY:Perth } 206

CITY:Sydney } 207

NUM:637,BASENAME:Elizabeth,TYP_AFT:St,CITY:Waterloo,POSTCODE:2017,STATE:NSW } 208

NUM:28,BASENAME:Macleay,TYP_AFT:St,SUBURB:Potts Point,CITY:Sydney,STATE:NSW,POSTCODE:2011 } 209

NUM:100,BASENAME:The Esplanade,POSTCODE:0800,CITY:Darwin,STATE:Northern Territory } 210

NUM:55,BASENAME:Hindmarsh,TYP_AFT:Square,CITY:Adelaide,STATE:SA,POSTCODE:5000 } 211

BASENAME:Coward,TYP_AFT:Street,CITY:Mascot,STATE:NSW,POSTCODE:2020 } 212

NUM:32,BASENAME:Richard,TYP_AFT:Street,CITY:Hervey Bay, STATE:Queensland,POSTCODE:4655 } 213

NUM:10,BASENAME:Casino,TYP_AFT:Rise,SUBURB:Prospect Vale,CITY:Launceston,STATE:TAS,POSTCODE:7250 } 214

NUM:2,BASENAME:Carlisle,CITY:Melbourne } 215

BASENAME:Fitzroy,TYP_AFT:Street,SUBURB:St. Kilda,POSTCODE:3182,CITY:Melbourne,STATE:Victoria } 216

NUM:150,BASENAME:Liverpool,SUBURB:Darlinghurst,POSTCODE:2010,CITY:Sydney } 217

BASENAME:Darlinghurst Road,POSTCODE:2010,CITY:Sydney,STATE:New South Wales } 218

NUM:418,BASENAME:Maitland,TYP_AFT:Road,SUBURB:Mayfield,CITY:Newcastle,STATE:NSW } 219

//^(?<keeper>[0-9]+) *(?<keeper>(/|-))(/|-)* *(?<keeper>[0-9]+)$,NUM
//^(?<keeper>[0-9]+)[\/\\\-]+\w*$,XNUM
//^[0-9]{4}$,POSTCODE
//^(nsw|vic|act|tas|sa|qld|nt|wa)$,STATE
//^(road|rd|street)$,TYP_AFT CITY:Melbourne
CITY:Sydney NUM:637,BASENAME:Elizabeth,TYP_AFT:St,CITY:Waterloo,POSTCODE:2017
NUM:637,BASENAME:Elizabeth,TYP_AFT:St,CITY:Waterloo,POSTCODE:2017,STATE:NSW
NUM:28,BASENAME:Macleay,TYP_AFT:St,CITY:Potts
Point,CITY:Sydney,STATE:NSW,POSTCODE:2011

NUM:100,BASENAME:The Esplanade,POSTCODE:0800,CITY:Darwin,STATE:Northern Territory
NUM:54,BASENAME:Terrace,TYP_AFT:Road,POSTCODE:6000,CITY:Perth
NUM:55,BASENAME:Hindmarsh,TYP_AFT:Square,CITY:Adelaide,STATE:SA,POSTCODE:5000
NUM:203,BASENAME:Coward,TYP_AFT:Street,CITY:Mascot,STATE:NSW,POSTCODE:2020
BASENAME:Richard,TYP_AFT:Street,CITY:Hervey Bay,STATE:Queensland,POSTCODE:4655
NUM:10,BASENAME:Casino,TYP_AFT:Rise,CITY:Prospect
Vale,CITY:Launceston,STATE:TAS,POSTCODE:7250

NUM:2,BASENAME:Carlisle,TYP_AFT:Street,SUBURB:St. Kilda
Beach,STATE:Victoria,POSTCODE:3182,CITY:Melbourne NUM:157,BASENAME:Fitzroy,TYP_AFT:Street,SUBURB:St.
Kilda,POSTCODE:3182,CITY:Melbourne,STATE:Victoria NUM:150,BASENAME:Liverpool,TYP_AFT:Street,CITY:Darlinghurst,POSTCODE:2010,CITY:Sydney
NUM:114,BASENAME:Darlinghurst,TYP_AFT:Road,POSTCODE:2010,CITY:Sydney,STATE:New
South Wales NUM:418,BASENAME:Maitland,TYP_AFT:Road,SUBURB:Mayfield,CITY:Newcastle,STATE:NSW
BASENAME:Tapleys Hill,STREET:Rd
NUM:197-199,BASENAME:O'Connell,TYP_AFT:Street,CITY:North
Adelaide,POSTCODE:5006,STATE:SA NUM:1,BASENAME:Military,TYP_AFT:Road,CITY:West Beach,POSTCODE:5024,STATE:SA
NUM:233,BASENAME:Victoria,TYP_AFT:Square,CITY:Adelaide,POSTCODE:5000,STATE:SA

Fig. 4

NATURAL LANGUAGE PARSERS TO NORMALIZE ADDRESSES FOR GEOCODING

CROSS-REFERENCE TO RELATED APPLICATION

The present application is a continuation of U.S. patent application Ser. No. 12/240,853, entitled "NATURAL LANGUAGE PARSERS TO NORMALIZE ADDRESSES FOR GEOCODING," filed Sep. 29, 2008, which claims priority under 35 U.S.C. §119(e) to U.S. Provisional Patent Application No. 60/976,341, entitled "Method for Building Natural Language Geocoders by Example," filed on Sep. 28, 2007; the disclosures of each of the foregoing applications are incorporated by reference herein in their entirety.

BACKGROUND OF THE INVENTION

1. Field of Invention

This invention relates to geocoding and more specifically to natural language parsers/splitters to normalize addresses.

2. Description of Related Art

Geocoding is the process of finding associated geographic coordinates (often expressed as latitude and longitude) from other geographic data, such as street addresses, or zip codes. With geographic coordinates the features can be mapped and entered into Geographic Information Systems (GIS), or the coordinates can be embedded into media such as digital photographs via geotagging. Generally, a geocoder is a piece of software or a (web) service that helps in this process.

Yet, there are many different addressing schemes and languages in the world. Hence, there is a need for a system that could understand those addressing schemes and languages, as well as all the different ways a human might write or input an address into a computer. The latter is referred to as "natural language" (or "ordinary language"), which is a language that is spoken, written, or signed by humans for general-purpose communication and often includes informal and/or abbreviated syntax, and relaxed adherence to grammatical rules. For example, when a user inputs an address, that input often does not adhere to standardized address formats processed by machines.

U.S. Pat. No. 7,039,640 to Miller et al., the disclosure of which is incorporated by reference herein in its entirety, discloses a system and method for geocoding diverse address formats. A single geocoding engine is taught that is allegedly capable of handling various address formats in use in different countries and jurisdictions. This engine uses country/jurisdiction specific parsers for isolating generic address components, e.g., street number, street, city, country, and postal code.

Conventionally, country/jurisdiction specific parsers are generated either by hand, or by manually describing the grammar and using a parser generator to construct a parser from the context free grammar. The former is extremely tedious and is prone to errors. As changes are made to improve hand crafter parsers, care needs to be taken not to upset addresses that previously could parse correctly. Manually describing the grammar as a context free grammar has its limitations as well, as ambiguous input (which is very common with street addresses) is not easily handled by this technique and as such the hit rate, i.e., matches between addresses input by a user and addresses accepted and known to a computer, is much lower.

SUMMARY OF THE INVENTION

The present invention overcomes these and other deficiencies of the prior art by automating the parser creation process. Particularly, the present invention provides a technique for building natural language parsers by implementing a country and/or jurisdiction specific set of training data that is automatically converted during a build phase to a respective predictive model, i.e., country specific natural language parser. The predictive model can be used at a later time without the training data to quantify any input address. This model may be included as part of a larger Geographic Information System (GIS) data-set or as a stand alone quantifier. The build phase may also be run on demand and the resultant predictive model kept in temporary storage for immediate use.

In an embodiment of the invention, a method for normalizing an input address comprises the steps of: receiving an input address, parsing the input address into components, classifying each component according to one or more predetermined regular expressions and a lexicon of known tokens, thereby generating classified components, and executing a predictive model to associate each classified component with a unique address field. The method may further include the step of executing the predictive model to generate a probability associated with each unique address field. The predictive model can be generated from a training file comprising the one or more predetermined regular expressions and exemplary tokens. The training file may be associated with a particular country or jurisdiction. The step of classifying each component can be performed by matching a component to the one or more predetermined regular expressions only when there is no match between that component and the lexicon of known tokens. The predictive model may be associated with a particular country or jurisdiction. The predictive model comprises a table of probabilities associated with the unique address fields.

In another embodiment of the invention, a method of constructing a natural language parser comprises the steps of: loading a training file defining an acceptable format for one or more regular expressions and comprising exemplary address field and token pairs; parsing the training file into a number of tokens; classifying the tokens according to a lexicon of known tokens and the regular expressions; and generating a predictive model that defines a probability for each of one or more address fields that may be associated with a given token. The method may further include the step of identifying the most likely address field for each of the classified tokens. The training file and predictive model are specific to a unique country or jurisdiction. The method may further include the step calculating the probability based on a number of times each classified token ends up in a given address field. The training file may indicate the relative positions of each exemplary token.

In another embodiment of the invention, a computer readable medium encoded with computer readable program code, the program code comprises the instructions of: parsing an input address into components, classifying each component according to one or more predetermined regular expressions and a lexicon of known tokens, thereby generating classified components, and executing a predictive model to associate each classified component with a unique address field. The computer readable medium may further comprise the instruction of executing the predictive model to generate a probability associated with each unique address field and/or the instruction of generating the predictive model from a training file comprising the one or more predetermined regular expressions and exemplary tokens. The training file is associated with a particular country or jurisdiction. The instruction of classifying each component may be performed by matching a component to the one or more predetermined regular expressions only when there is no match between that component and the lexicon of known tokens. The predictive model may also be associated with a particular country or jurisdiction. The predictive model may comprise a table of probabilities associated with the unique address fields.

The present invention provides numerous advantages over conventional approaches as it removes the tedium of building a country and/or jurisdiction specific parser for each respective addressing scheme. Also, training the parser becomes much less of a balancing act—in conventional parsers, if you make a change so that the parser can recognize a new street type, it may start incorrectly parsing some addresses that previously it parsed correctly, so every change that is made has to be made more and more carefully so as to not upset addresses that already parse correctly. The probabilistic nature of the predictive model allows ambiguities in the input to be naturally handled and the most likely parsing(s) can be found.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which:

FIG. 2 illustrates an exemplary training file for a unique jurisdiction, i.e., Australia, according to an embodiment of the invention;

FIG. 4 illustrates an exemplary training file used to generate the predictive model of FIG. 3.

DETAILED DESCRIPTION OF EMBODIMENTS

Further features and advantages of the invention, as well as the structure and operation of various embodiments of the invention, are described in detail below with reference to the accompanying FIGS. 1-4. The embodiments of the invention are described in the context of geocoding normalized address fields. Nonetheless, one of ordinary skill in the art readily recognizes that the present technique may be applied to other applications that use normalized data fields as input.

The present invention provides a software technique for automatically generating natural language country and/or jurisdiction parsers that can understand all of the ways a person might write an address, as well as the many various addressing formats in use around the world. Any computer language may be used to implement the present software, the identification of which is apparent to one of ordinary skill in the art—nonetheless, the following exemplary embodiments are described in the context of the C-sharp ("C#") programming language. This software may be implemented on any type of computer hardware including, but not limited to a personal computer, mobile computer, workstation, and server, the implementation of which is apparent to one of ordinary skill in the art.

Figure 1:
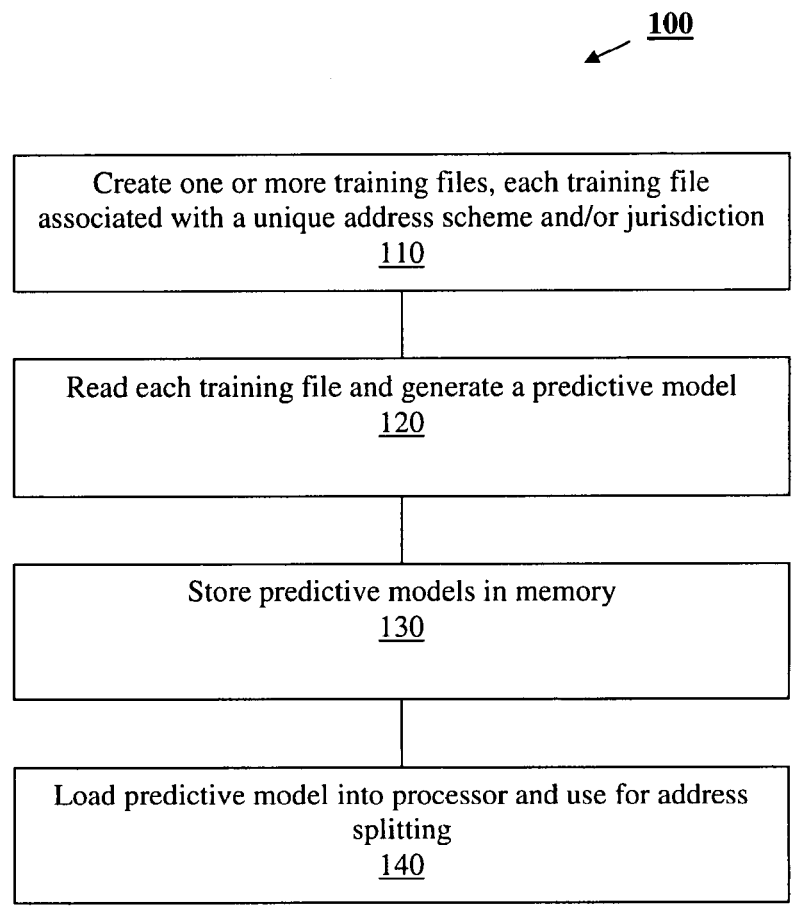
FIG. 1 illustrates process for normalizing addresses according to an embodiment of the invention.

FIG. 1 illustrates a process 100 for normalizing addresses according to an embodiment of the invention. The method 100 comprises a number of steps, first starting with the creation of one or more training files. For example, a training file is created (step 110) for each unique addressing scheme and/or jurisdiction. The training file is then read by a computer processor, which in turn uses such to generate (step 120) a respective predictive model. The predictive model is then stored (step 130) within memory or suitable storage means, the identification and implementation of which is apparent to one of ordinary skill in the art. The predictive model is then read (step 140) into a computer processor and used (step 150) for address parsing of a user's inputted address into normalized address fields.

FIG. 2 illustrates an exemplary training file 200 for a unique jurisdiction, i.e., Australia, according to an embodiment of the invention. Particularly, the first four lines 201-204 define the acceptable syntax for regular expressions ("regexes") for a generic parser. These regular expressions are presented in .Net syntax, the implementation of which is apparent to one of ordinary skill in the art. During parsing, an given input address is broken up into tokens on separator characters such as spaces, commas, semicolons, colons, spaces, etc. or a combination thereof. In a preferred embodiment, commas are used as separator characters. The generic parser works by using a lexicon of known tokens and the regular expressions to classify each token before sending the string of classified tokens to the predictive model to calculate the most likely categories for each token.

Particularly, these tokens are looked up in the lexicon, which is built during import of the training file. The difference between a regular expression and a token is that a regular expression is a concise language for expressing a set of strings, whereas a token is the constituent part of a complete input. The parser is responsible for splitting the input up into meaningful "tokens"—for example "Street," or "Main"—or even "Santa Monica" as a single token. A string is said to match a regular expression if that string is in the set of strings defined by that regular expression. After the input string is "tokenized" it is matched against the lexicon and/or the list of regexes until a match is found.

In an embodiment of the invention, the lexicon is built during import of street data from shapefile format into the GeoBase (GBFS) format, the implementation of which is apparent to one of ordinary skill in the art. The underlying street data has each component stored separately (e.g., W/Main/St/Santa Monica), which means during analysis the category that a given token appears in most frequently is the one that it will be inserted into the lexicon as, e.g., Santa Monica may be both a City and a BaseName (as in Santa Monica Blvd), however, it is much more common in the data as a city name, so that is what it is classified as in the lexicon.

If the parsed token cannot be found in the lexicon, it is matched against the regular expressions until one succeeds. The label at the end of the regexes is then applied to that token (e.g., POSTCODE or XNUM). XNUM in this context is the classification given to tokens that match the regex on line 202. This is later used by the predictive model to assign a final address field (probably street number in this exemplary case) to the token. The classification given by the lexicon or regex does not necessarily correspond directly to an address field. The predictive model may indicate that a token classified as City (e.g., Santa Monica) should actually be a Basename because of context, for example.

Only four regexes are shown in FIG. 2 because the majority of tokens will be classified by the lexicon. Also, there are a number of implied regexes that don't need to be specifically included in the training file. These are:

^[0-9]+$,NUM
^\d+[NSEW-]\d+$,BNUM
^\S\d+$,BNUM
^[NSEW]\d+[NSEW]\d+$,BNUM

```
^[NSEW]\d+$,BNUM
^\d+[EW]$,BNUM
^[a-z\-\s]+$,ALPHA
^[',]+$,ALPHANUM
```

The remainder of the file 200 describes the training proper. Each line consists of a set of comma separated values. Each value, e.g., BASENAME, TYP_AFT, CITY, POSTCODE, NUM) is a Label:Token pair. For example, in line 205, the first Label:Token pair is BASENAME:Elizabeth, such that "BASENAME" is a Label and "Elizabeth" is the token. The token from each pair is labeled using the lexicon or a regular expression as described above. This label is then compared to the label in the training to build a table of probabilities for the predictive model. For example, referring again to line 205, which fully reads:

BASENAME:Elizabeth,TYP_AFT:St,CITY:Waterloo, POSTCODE:2017

The "Elizabeth" token is looked up in the lexicon and found to be a known token referred to as BASENAME. This matches the label in the training file 200 so at this point the BASENAME label is considered to be BASENAME 100% of the time.

Referring to line 206, which reads:

NUM:54,BASENAME:Terrace,TYP_AFT:Road,POSTCODE:6000,CITY:Perth

Here, the BASENAME is "Terrace." When this is looked up in the lexicon it is reported as TYP_AFT, as it most commonly appears as a street suffix. This contradicts the existing probabilities and the model is updated so that the BASENAME position is filled by a token labeled BASENAME 50% of the time and a token labeled TYP_AFT 50% of the time. In this way, a representative list of addresses will likely set BASENAME to 80-90%, and other token types the remainder of the time.

The probabilities are calculated based on the number of times each classification ends up in a given address field during training. So in the example, the first line 205 has Elizabeth, which is classified as BASENAME by the lexicon, and BASENAME by the training data. This gives BASENAME-BASENAME a 100% hit rate. The second line 206 classifies Terrace as TYP_AFT, but the training puts it into the BASENAME address field, so now BASENAME-BASENAME happens 50% of the time, while TYP_AFT-BASENAME happens the other 50%. Once the entire training set is processed, most datasets come out to 80-90% because typically, tokens in the BASENAME address field will have been classified as BASENAME in the first instance, by the lexicon.

Figure 3:
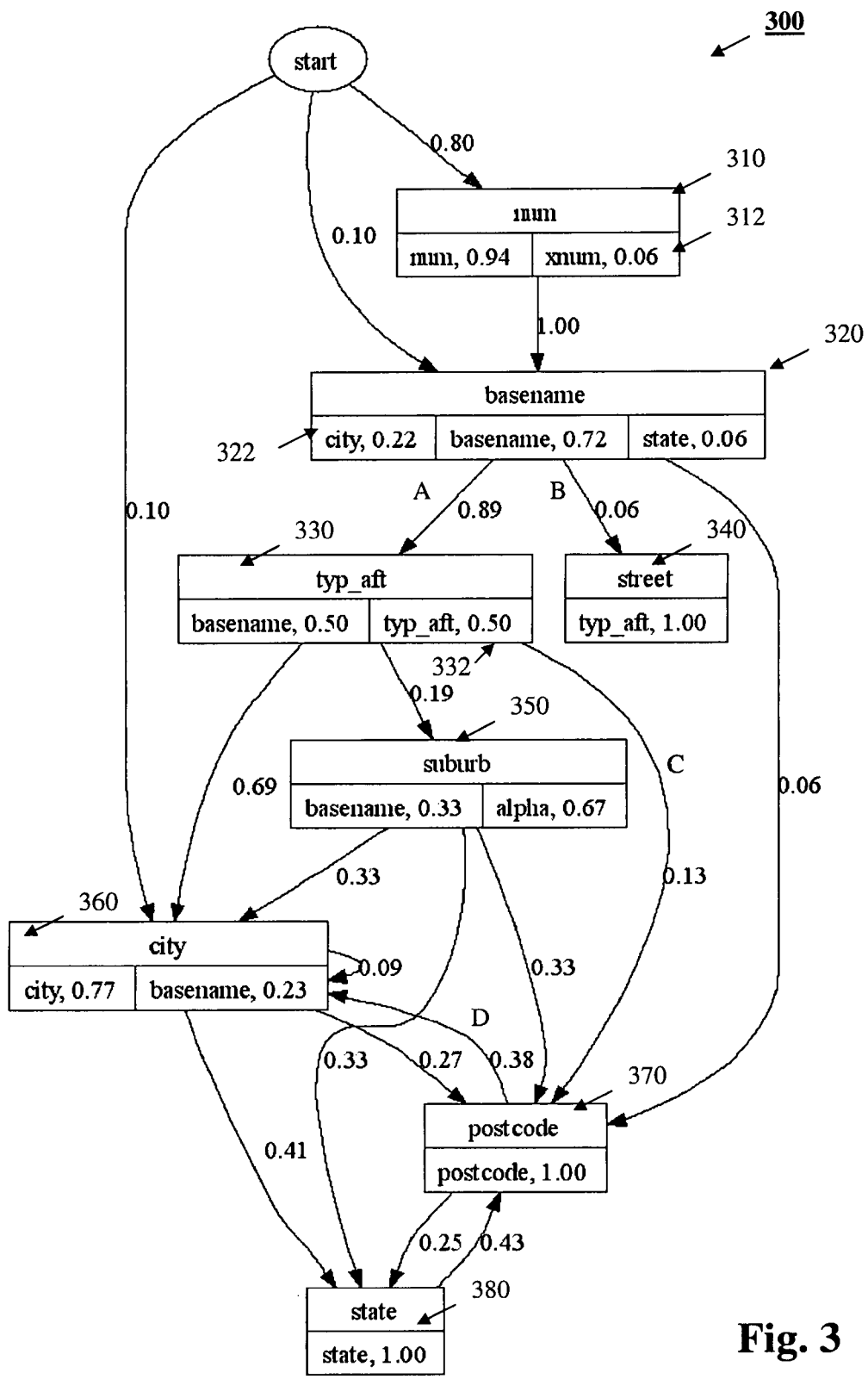
FIG. 3 illustrates a predictive model according to an embodiment of the invention.

Each output position or token (NUM, BASENAME, CITY, etc.) has its table of possible input labels and table of probabilities populated by the end of the training file. The table of probabilities is in memory at this point and is saved into the resulting street dataset at the end of the training session. The table of probabilities is used to construct the predictive model, e.g., the graph as shown in FIG. 3, which is further described below.

Another function of the training file is to indicate the relative positions of each token. For example, referring to line 207, which reads:

CITY: Sydney

This line determines that the very first token may be the city. Whereas, referring to line 208, which reads:

NUM:637,BASENAME:Elizabeth,TYP_AFT:St,CITY: Waterloo,POSTCODE:2017,STATE:NSW determines that the input may in fact begin with a number, and that the sequence NUM,BASENAME,TYP_AFT,CITY, POSTCODE,STATE is valid. In this way, all training lines, e.g., 208-219, are used to determine all the possible 'next positions' from any given output. For example, BASENAME may be validly followed by TYP_AFT, SUBURB, CITY or POSTCODE in line 208.

FIG. 3 illustrates a predictive model 300 according to an embodiment of the invention. This graphical depiction of the predictive model 300 is generated from a slightly different training set, which is shown in FIG. 4, than that shown in FIG. 2. Each box, i.e., boxes 310-380, consists of two lines. The first line is the address field and the second line is a set of token classifications that may validly be seen at that position. There are two sets of probabilities in this graph: (1) the probabilities on the edges and (2) the probabilities within a single address field box. All the edges coming out of a given address field have probabilities that sum to 1. Also, all the token classification probabilities within a single address field have probabilities that sum to 1.

Consider the address "101-103 Liverpool Road, 6000 Perth" as an input address for the predictive model 300. This is split into five tokens and each token is classified. The first token "101-103" isn't in the lexicon so it will match the XNUM regex. Liverpool is in the lexicon as a CITY. Road is in the lexicon as a TYP_AFT ("type after"). 6000 isn't in the lexicon, but will match the POSTCODE regex, and PERTH is in the lexicon as a CITY. Therefore, this address will have the tokenized classification of: XNUM CITY TYP_AFT POSTCODE CITY.

It is now up to the predictive model 300 to decide which address field label each token truly belongs in. The first step is simple—the only place XNUM appears is as a classified token 312 on the NUM address field 310 directly below the start state. There is no other possible location for this, so 101-103 is put into the NUM address field 310, and the probability becomes 0.80*0.06=0.048 (so far).

Next we must place the CITY token according to the predictive model 300. The only address field that can follow NUM, according to this model 300 is the address field 320 pertaining to BASENAME, and this field can accept CITY as a classified token 322, so our address field BASENAME gets the value Liverpool, and the probability is 0.048*1.00*0.22=0.01056.

Next we have a TYP_AFT token from the input address. There are two possible paths A and B to follow now in the predictive model 300. The predictive model 300 could put it into the TYP_AFT classified token 332 in the address field 330 following path A, or it could be put into the STREET address field 340 following path B. The latter is due to an error in the training file—there is no recognized address field named STREET. This error is presented as an example of the invention's robustness, and will not cause a problem though, because the parser will see it as such a low probability to not be a likely candidate.

The action taken when faced with a choice of address fields like this is to choose both, continue on each branch until the end of the address, and finally take the n highest probability parsings. So in this example, the predictive model 300 would take the TYP_AFT address field branch 330 along path A for a probability of 0.01056*0.89*0.50=0.0047 (with 2 significant figures), and also the STREET address field 340 along path B for a probability of 0.01056*0.06*1.00=0.00063 (2 significant figures). At this point, there are two potential branches and the predictive model 300 will continue with both until the end (or until the probability reaches zero, at which point we can give up on that branch).

Next, we have a POSTCODE token. Our first possible branch C can put this into a POSTCODE field 370, with a probability of 0.0047*0.13*1.00=6.1×10$^4$. Our second branch from the STREET address field 340 has no output edges available, so any more tokens would be considered a probability of zero. At this point we can give up on the second parsing, which was following path B, and continue on with the first parsing (following path A and branch C), which is currently: NUM:101-103, BASENAME: Liverpool, TYP_AFT:Road, POSTCODE:6000, ??:Perth.

Finally, from the POSTCODE field 370, it can be followed by a CITY token in the CITY field 360 along path D with a probability of $6.1 \times 10^{-4} * 0.38 * 0.77 = 1.79 \times 10^{-4}$, which is our final probability for the parsing:

NUM: 101-103
BASENAME: Liverpool
TYP_AFT: Road
POSTCODE: 6000
CITY: Perth

All other known address fields (SUBURB 350 and STATE 380) are empty for the given input address.

FIG. 4 illustrates an exemplary training file 400 for a unique jurisdiction, i.e., Australia, according to an embodiment of the invention. This training file was used to generate the predictive model 300 as described and implemented above.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed.

We claim:

1. A method for normalizing an input address, comprising:
   under control of a computer system comprising computer hardware:
   identifying an input address indicative of a physical address;
   selecting a predictive model corresponding to the input address from a plurality of predictive models, each of the plurality of predictive models being an automated country-specific natural language parser uniquely defined for a corresponding one of a plurality of countries and jurisdictions, the selected predictive model comprising a graph having address field nodes and edges connecting the address field nodes, each of at least some of the address field nodes comprising an address field and a corresponding set of one or more address field classifications each assigned a first probability value, each of at least some of the edges assigned a second probability value; and
   executing the selected predictive model to determine an address field classification for the input address from one of the address fields in the graph based at least on the first and second probability values of the address field nodes and the edges that correspond to the address field classification.

2. The method of claim 1, wherein said executing comprises executing the selected predictive module to determine a plurality of address field classifications for the input address from the address field nodes in the graph, the plurality of address field classifications including the address field classification.

3. The method of claim 1, further comprising generating the selected predictive model from a training file, the training file comprising a plurality of tokens.

4. The method of claim 3, wherein the training file defines one or more address expression formats.

5. The method of claim 3, wherein the training file is associated with a particular country or jurisdiction.

6. The method of claim 1, wherein the selected predictive model comprises a table of probabilities associated with the address fields.

7. A system for normalizing address input, the system comprising:
   computer hardware programmed to:
   identify an input address indicative of a physical address;
   select a predictive model corresponding to the input address from a plurality of predictive models, each of the plurality of predictive models representing an automated country-specific natural language parser uniquely defined for a corresponding one of a plurality of jurisdictions, the selected predictive model comprising (1) address field data including address fields and address field classifications corresponding to the address fields and (2) probability values assigned to the address field data; and
   execute the selected predictive model to match a selected one of the address field classification with the input address based at least on the probability values.

8. The system of claim 7, wherein the computer hardware is further configured to generate the selected predictive model from a training file, the training file comprising a plurality of tokens training field values.

9. The system of claim 8, wherein the training file defines one or more address expression formats.

10. The system of claim 8, wherein the training file is associated with a particular jurisdiction.

11. The system of claim 8, wherein the computer hardware is further configured to generate the selected predictive model by identifying a most likely address field of the address fields for each of at least some of the plurality of tokens.

12. The system of claim 8, wherein the computer hardware is further configured to generate the selected predictive model by determining a number of times that the plurality of tokens occur in a given address field of the address fields.

13. The system of claim 7, wherein the selected predictive model comprises a table of probabilities associated with the address fields.

* * * * *